(12) United States Patent
Creager

(10) Patent No.: US 9,309,957 B2
(45) Date of Patent: Apr. 12, 2016

(54) LOCKING DIFFERENTIAL HAVING COMBINATION PRELOAD SPRINGS FOR MAINTAINED CONTACT

(71) Applicant: Eaton Corporation, Cleveland, OH (US)

(72) Inventor: Christopher W. Creager, Ypsilanti, MI (US)

(73) Assignee: Eaton Corporation, Cleveland, OH (US)

( * ) Notice: Subject to any disclaimer, the term of this patent is extended or adjusted under 35 U.S.C. 154(b) by 40 days.

(21) Appl. No.: 14/013,267

(22) Filed: Aug. 29, 2013

(65) Prior Publication Data

US 2014/0171252 A1    Jun. 19, 2014

Related U.S. Application Data

(60) Provisional application No. 61/694,501, filed on Aug. 29, 2012.

(51) Int. Cl.
*F16H 48/22* (2006.01)
*F16H 48/19* (2012.01)

(52) U.S. Cl.
CPC ............... *F16H 48/22* (2013.01); *F16H 48/19* (2013.01)

(58) Field of Classification Search
CPC ....... F16H 48/19; F16H 48/22; F16H 48/142; F16H 48/145; B60W 10/16; F16D 2023/123; F16D 41/063

USPC ............ 74/424, 650; 475/220, 223, 234, 235, 475/240; 192/49, 50, 54.5, 70.23, 70.27, 192/89.2, 93 A

See application file for complete search history.

(56) References Cited

U.S. PATENT DOCUMENTS

| 3,253,483 | A |   | 5/1966 | McCaw |
|---|---|---|---|---|
| 3,264,900 | A |   | 8/1966 | Hartupee |
| 3,596,740 | A | * | 8/1971 | Nau ................................. 188/74 |

(Continued)

FOREIGN PATENT DOCUMENTS

| EP | 0 091 747 A2 | 10/1983 |
|---|---|---|
| EP | 0 683 333 A1 | 11/1995 |

(Continued)

OTHER PUBLICATIONS

"Series and parallel springs", Wikipedia excerpt from Keith Symon (1971), Mechanics. Addison-Wesley. ISBN 0-201-07392-7.*

(Continued)

*Primary Examiner* — William Kelleher
*Assistant Examiner* — Thomas Magnuson
(74) *Attorney, Agent, or Firm* — Merchant & Gould

(57) ABSTRACT

A locking differential for a vehicle includes a rotatable housing and a differential mechanism supported in the housing. The differential mechanism includes a pair of clutch members wherein each of the clutch members presents an inwardly directed face. Each face includes a groove disposed in spacing relationship with respect to the other. A cross pin is received in the groove and is operatively connected for rotation with the housing. The clutch members are axially moveable within the housing so that they may engage respective clutch members coupled to a pair of axle half shafts. A plurality of springs apply a pre-load to only the clutch members, wherein contact is maintained between the clutch members and the cross pin.

26 Claims, 5 Drawing Sheets

(56) References Cited

U.S. PATENT DOCUMENTS

| | | | |
|---|---|---|---|
| 3,611,833 A | 10/1971 | Baremor | |
| 3,886,813 A | 6/1975 | Baremor | |
| 3,906,812 A | 9/1975 | Kagata | |
| 4,136,582 A | 1/1979 | Boor | |
| 4,304,397 A * | 12/1981 | Zanow | 267/201 |
| 4,498,355 A | 2/1985 | Schou | |
| 4,735,108 A | 4/1988 | Teraoka et al. | |
| 4,754,661 A | 7/1988 | Barnett | |
| 4,845,831 A | 7/1989 | Schou | |
| 4,865,173 A | 9/1989 | Leigh-Monstevens et al. | |
| 4,903,809 A | 2/1990 | Kiblawi et al. | |
| 4,939,953 A | 7/1990 | Yasui | |
| 4,978,329 A | 12/1990 | Yasui et al. | |
| 5,019,021 A | 5/1991 | Janson | |
| 5,413,015 A | 5/1995 | Zentmyer | |
| 5,441,131 A | 8/1995 | Mayer et al. | |
| 5,603,397 A | 2/1997 | Meyers | |
| 5,715,733 A | 2/1998 | Dissett | |
| 5,727,430 A | 3/1998 | Valente | |
| 5,823,908 A | 10/1998 | Stefanek | |
| 5,901,618 A | 5/1999 | Tyson et al. | |
| 5,967,276 A * | 10/1999 | Leichliter et al. | 192/35 |
| 5,971,120 A | 10/1999 | Bessemer et al. | |
| 6,062,105 A | 5/2000 | Tyson et al. | |
| 6,083,134 A | 7/2000 | Godlew | |
| 6,102,178 A * | 8/2000 | Walton | 192/35 |
| 6,105,465 A | 8/2000 | Tyson et al. | |
| 6,374,701 B1 | 4/2002 | Tittjung | |
| 6,394,927 B1 | 5/2002 | Bongard | |
| 6,463,830 B1 | 10/2002 | Ito et al. | |
| 6,491,126 B1 | 12/2002 | Robison et al. | |
| 6,607,062 B1 | 8/2003 | Heatwole et al. | |
| 6,688,194 B2 | 2/2004 | Dissett et al. | |
| 6,884,196 B1 | 4/2005 | Ziech | |
| 7,104,912 B2 | 9/2006 | Morgensai | |
| 7,178,420 B2 | 2/2007 | Barth | |
| 7,264,569 B2 | 9/2007 | Fox | |
| 7,311,632 B2 | 12/2007 | Dissett et al. | |
| 7,361,115 B2 | 4/2008 | Morgensai | |
| 7,625,308 B2 * | 12/2009 | Okazaki | 475/160 |
| 7,823,711 B2 | 11/2010 | Uhler et al. | |
| 7,874,954 B2 | 1/2011 | Dissett et al. | |
| 8,146,458 B2 | 4/2012 | Radzevich | |
| 2003/0066386 A1 | 4/2003 | Dissett et al. | |
| 2004/0237689 A1 | 12/2004 | Hiltbrand | |
| 2005/0288144 A1 | 12/2005 | Wang et al. | |
| 2008/0060474 A1 | 3/2008 | Mizukawa et al. | |
| 2008/0103008 A1 | 5/2008 | Gleasman et al. | |
| 2008/0176703 A1 | 7/2008 | Hoberg | |
| 2008/0190240 A1 | 8/2008 | Dissett et al. | |
| 2009/0011890 A1 | 1/2009 | Bawks | |
| 2010/0113208 A1 | 5/2010 | Haugeberg | |
| 2010/0276243 A1 | 11/2010 | Arhab et al. | |
| 2011/0021304 A1 | 1/2011 | Radzevich | |
| 2011/0021306 A1 | 1/2011 | Radzevich | |
| 2014/0141920 A1 | 5/2014 | Creager | |
| 2014/0162828 A1 | 6/2014 | Creager | |

FOREIGN PATENT DOCUMENTS

| | | |
|---|---|---|
| EP | 0 838 612 A2 | 4/1998 |
| EP | 1 767 817 A1 | 3/2007 |
| EP | 1 898 124 A2 | 3/2008 |
| FR | 769 239 | 8/1934 |
| FR | 2 382 627 A1 | 9/1978 |
| WO | WO 2005/111471 A1 | 11/2005 |
| WO | WO 2014/085554 A1 | 6/2014 |

OTHER PUBLICATIONS

Invitation to Pay Additional Fees with Partial International Search for PCT/US2013/056586 mailed Jan. 30, 2014.
International Search Report and Written Opinion for PCT/US2013/056586 mailed Apr. 11, 2014.
U.S. Appl. No. 14/203,816, filed Mar. 11, 2014 entitled "Inboard Spring Arrangement for a Clutch Actuated Differential".

* cited by examiner

LOCKING DIFFERENTIAL HAVING COMBINATION PRELOAD SPRINGS FOR MAINTAINED CONTACT

CROSS REFERENCE TO RELATED APPLICATIONS

This application claims the benefit of U.S. Provisional Application Ser. No. 61/694,501, filed Aug. 29, 2012, entitled LOCKING DIFFERENTIAL HAVING COMBINATION PRELOAD SPRINGS FOR MAINTAINED CONTACT, which is incorporated herein by reference in its entirety.

BACKGROUND

1. Technical Field

The present teachings relate generally to locking differentials for vehicles and, more specifically, to features of a locking differential having preload springs for maintained contact.

2. Description of the Related Art

Locking differentials of the type contemplated by the present teachings are employed as a part of a drive train and generally include a pair of clutch members supported for rotation in a housing. A pair of side gears is splined for rotation to corresponding axle half shafts. A clutch mechanism is interposed between the clutch members and the side gears. A cross pin is operatively mounted for rotation with the housing and is received in a pair of opposed grooves formed on the inwardly facing surfaces of the clutch members. In an event requiring differential rotation between the axle half shafts, such as cornering, the higher speed axle shaft advances its clutch to an over-running condition, decoupling it from the powertrain torque. If the driving terrain provides insufficient traction to activate the over-running feature of the differential, or while driving in a straight line, torque is applied equally to both axle shafts.

While locking differentials of this type have generally worked for their intended purposes, certain disadvantages remain. More specifically, for reasons of noise/vibration/harshness (NVH) and performance, the clutch members must have a pre-load acting on them, forcing maintained contact between a driver shaft or cross pin and clutch members and, in turn, preventing a "contact" noise during relative motion of the cross pin and clutch members during operation of the differential mechanism. The clutch discs need pre-load to generate the resistance to rotate force, allowing the engagement motion of the cross pin on the clutch members. In particular, the clutch members generally need relatively small pre-load for abatement of NVH, but the clutch mechanisms need variability in their pre-load based upon parameters of the corresponding vehicle, and is additionally influenced by the pre-load of the clutch members. Adding pre-load to the clutch members generates additional axial resistance to compression, as defined by the incline angle of the groove geometry. Known designs apply a pre-load to the clutch mechanisms that influence the entire differential mechanism, which is undesired.

Thus, there remains a need in the art for a locking differential that is designed so as to prevent a "contact" noise during relative motion of a cross pin and clutch members during operation of a differential mechanism.

SUMMARY

The present disclosure relates to a differential for a vehicle having a differential housing that is rotatable about an axis of rotation. The differential also has clutch members positioned within the differential housing and disposed in spaced axial relationship with respect to one another along the axis of rotation. The differential further includes side gears adapted for rotation with corresponding axle half shafts relative to the differential housing about the axis of rotation and a cross pin carried with the differential housing as the differential housing rotates about the axis of rotation. The differential additionally has clutch mechanisms each including clutch packs for transferring torque between the clutch members and the side gears. The clutch members present inwardly directed faces between which the cross pin is disposed. The inwardly directed faces define opposing grooves in which the cross pin is received. The differential also includes a plurality of first pre-load springs that apply first pre-loads to the clutch members for biasing the clutch members toward the cross pin. The first pre-loads are not applied through the clutch packs.

In one aspect of the present teachings, by moving a "spring contact" point outward to a clutch member, a pre-load can be applied only to the clutch member, which maintains the contact between the clutch members and cross pin and allows the use of higher "spring" loads since the corresponding clutch pack receives no additional load. However, care must be taken not to increase the compression resistance force generated by the pre-load force and ramp angle geometry to a value higher than the "clutch mechanism's" tear torque can retain. If this threshold is exceeded, the clutch members rotate without compressing.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

Other aspects of the present teachings will be readily appreciated, as the same becomes better understood after reading the subsequent description taken in connection with the accompanying drawings wherein.

DETAILED DESCRIPTION

Figure 1:
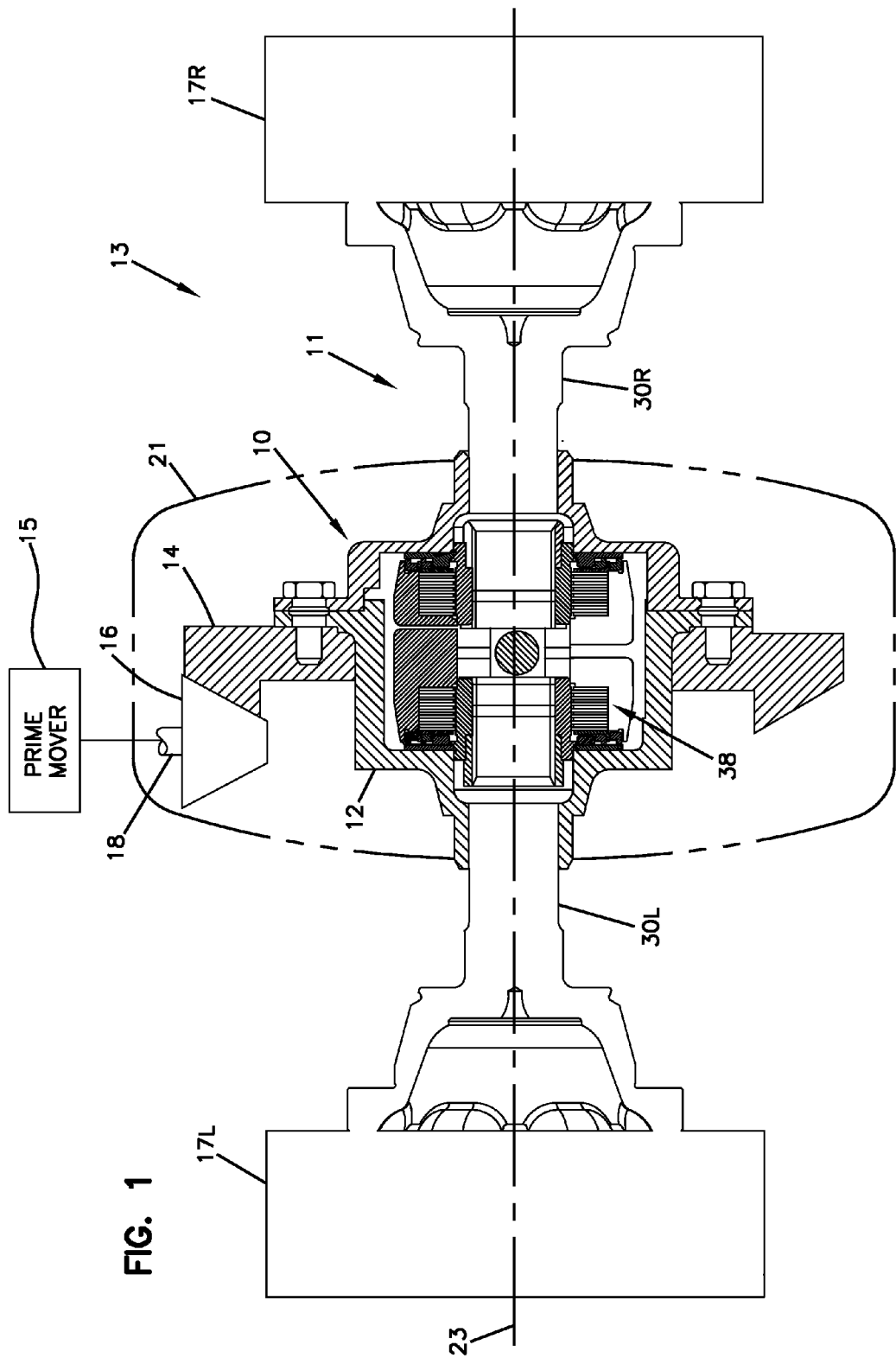
FIG. 1 is a schematic cross-sectional view of an axle assembly including a differential in accordance with the principles of the present disclosure.

FIG. 1 illustrates an axle assembly 11 incorporating a differential 10 in accordance with the principles of the present disclosure. The axle assembly 11 is part of a drive train 13 used to transfer torque from a prime mover 15 (e.g., an engine, a motor, or like power source) to left and right wheels 17L, 17R. The differential 10 includes a differential housing 12 (i.e., a differential case) and a differential mechanism 38 (i.e., a differential torque transfer arrangement) positioned within the differential housing 12. The differential housing 12 carries a gear 14 (e.g., a ring gear) that intermeshes with a drive gear 16 driven by a driveshaft 18 of the drivetrain 13. The differential mechanism 38 is configured to transfer torque from the differential housing 12 to left and right half axle half shafts 30L, 30R that respectively correspond to the left and right wheels 17L, 17R. The differential 10 is enclosed within an axle housing 21 that protects the differential 10 and contains lubricant (e.g., oil) for lubricating moving parts within the axle housing 21. The differential housing 12 is mounted to rotate relative to the axle housing 21 about an axis of rotation 23. In one example, bearings can be provided between the differential housing 12 and the axle housing 21 to allow the differential housing 12 to freely rotate about the axis of rotation 23 relative to the axle housing 21. The left and right axle half shafts 30L, 30R are co-axially aligned along the axis of rotation 23.

In certain examples, the axle assembly 11 can be incorporated into a vehicle such as an all-terrain vehicle, a light utility vehicle, or other type of vehicle. The differential 10 of the axle assembly 11 is configured to prevent individual wheel spin and to provide enhanced traction performance on a variety of surfaces such as mud, wet pavement, loose dirt and ice. In use, torque for rotating the differential housing 12 about the axis of rotation 23 is provided by the drive gear 16 that intermeshes with the ring gear 14 carried by the differential housing 12. The differential mechanism 38 includes left and right clutches (e.g., disc style clutches) configured to transfer torque from the rotating differential housing 12 to the left and right axle half shafts 30L, 30R thereby driving rotation of the left and right wheels 17L, 17R. When the vehicle is driven straight, the left and right clutches are both actuated such that torque from the differential housing 12 is transferred equally to the left and right axle shafts 30L, 30R. When the vehicle turns right, the left clutch is de-actuated while the right clutch remains actuated. In this state, the differential mechanism 38 continues to drive rotation of the right axle shaft 30R while the left axle shaft 30L is allowed to free wheel at a higher rate of rotation than the right axle shaft 30R. When the vehicle makes a left turn, the right clutch is de-actuated while the left clutch remains actuated. In this state, the differential mechanism 38 continues to drive rotation of the left axle shaft 30L while the right axle shaft 30R is allowed to free wheel at a higher rotational speed than the left axle shaft 30L.

It will be appreciated that the differential housing 12 can also be referred to as a differential carrier, a ring gear carrier, a carrier, a differential casing, or like terms. Also, the axle housing 21 can be referred to as a carrier housing, a service housing or like terms.

Figure 2:
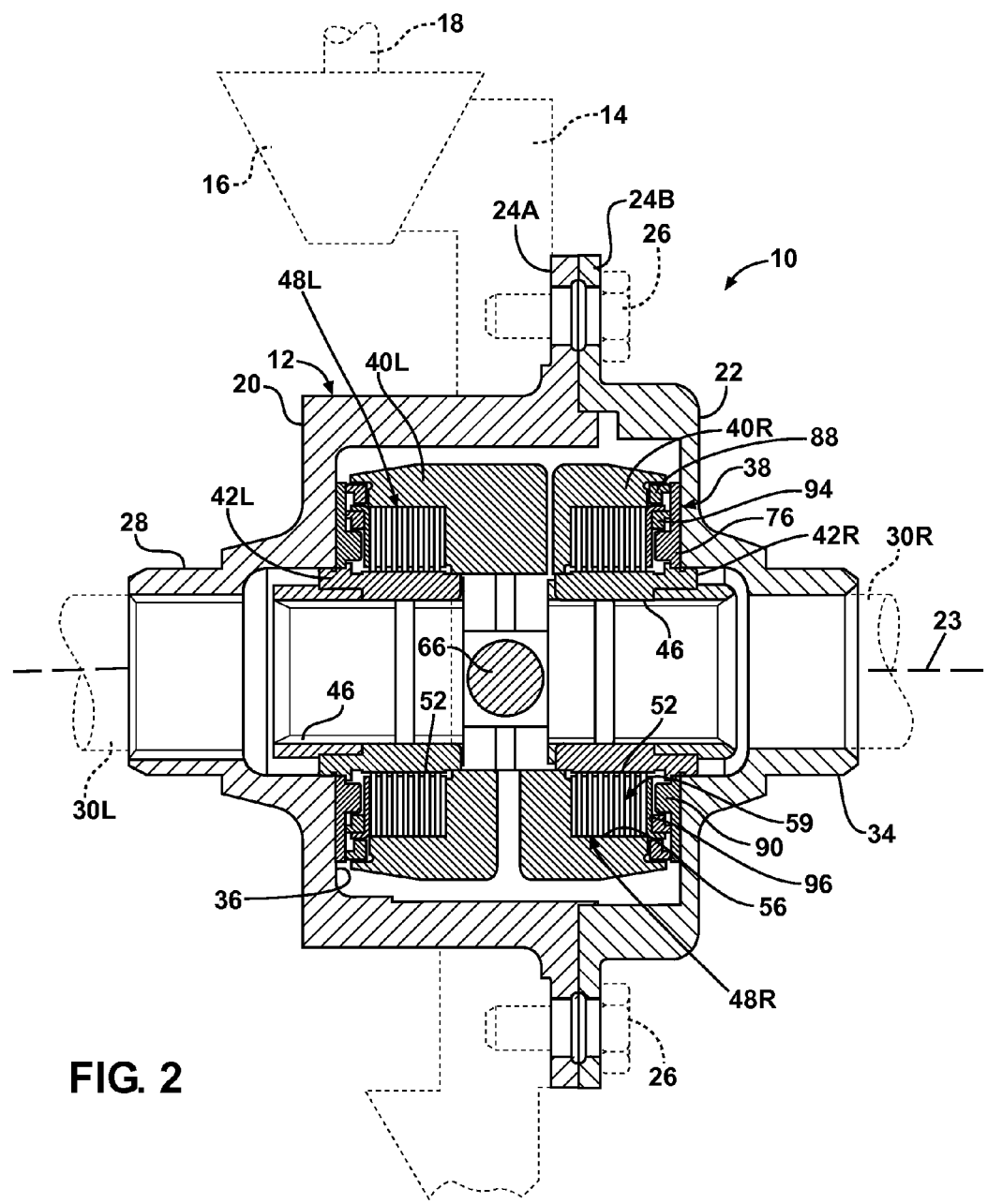
FIG. 2 is a cross-sectional side view of a locking differential of the present teachings illustrating a drive shaft, pinion gear and ring gear of the drive train in phantom.
Figure 3:
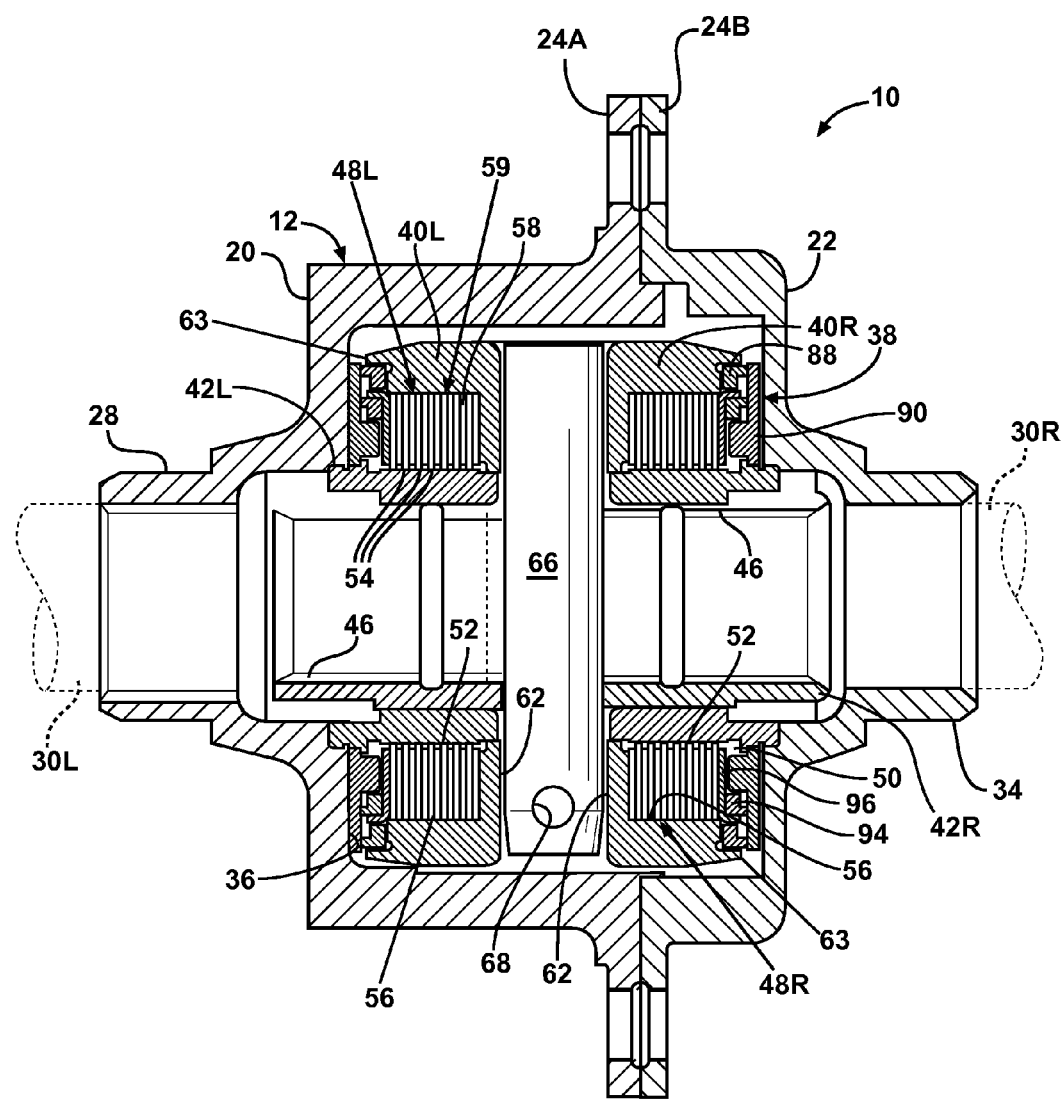
FIG. 3 is a cross-sectional side view of a locking differential of the present teachings illustrating the disposition of a cross pin relative to clutch members.

Referring to FIGS. 2 and 3, the differential housing 12 may be composed of a main body 20 and a cap 22 that is fixedly mounted to the main body 20 at a pair of mating annular flange portions 24A and 24B via fasteners 26 or any other suitable fastening mechanism. The ring gear 14 may also be mounted to the housing 12 at the mating flanges 24A, 24B via the fastener 26. Those skilled in the art will appreciate in light of the disclosure that follows that the housing 12 may be defined by any conventional structure known in the related art and that the present teachings are not limited to a housing defined by a main body and a cap portion. Similarly, the housing 12 may be driven by any conventional drive mechanism known in the related art and that the present teachings are not limited to a housing that is driven via a ring gear, pinion gear, and drive shaft.

The main body 20 defines a hub 28 that supports the left axle shaft 30L (e.g., via a rotational bearing) to allow for rotation relative to the housing 12 about the axis of rotation 23. Similarly, the cap 22 defines an opposed hub 34 that supports the right axle half shaft 30R (e.g. via a rotational bearing) to allow for rotation relative to the housing 12 about the axis of rotation 23. Together, the main body 20 and cap 22 of the case 12 cooperate to define a cavity 36. The differential mechanism 38, is supported in the cavity 36 defined by the housing 12.

Figure 4:
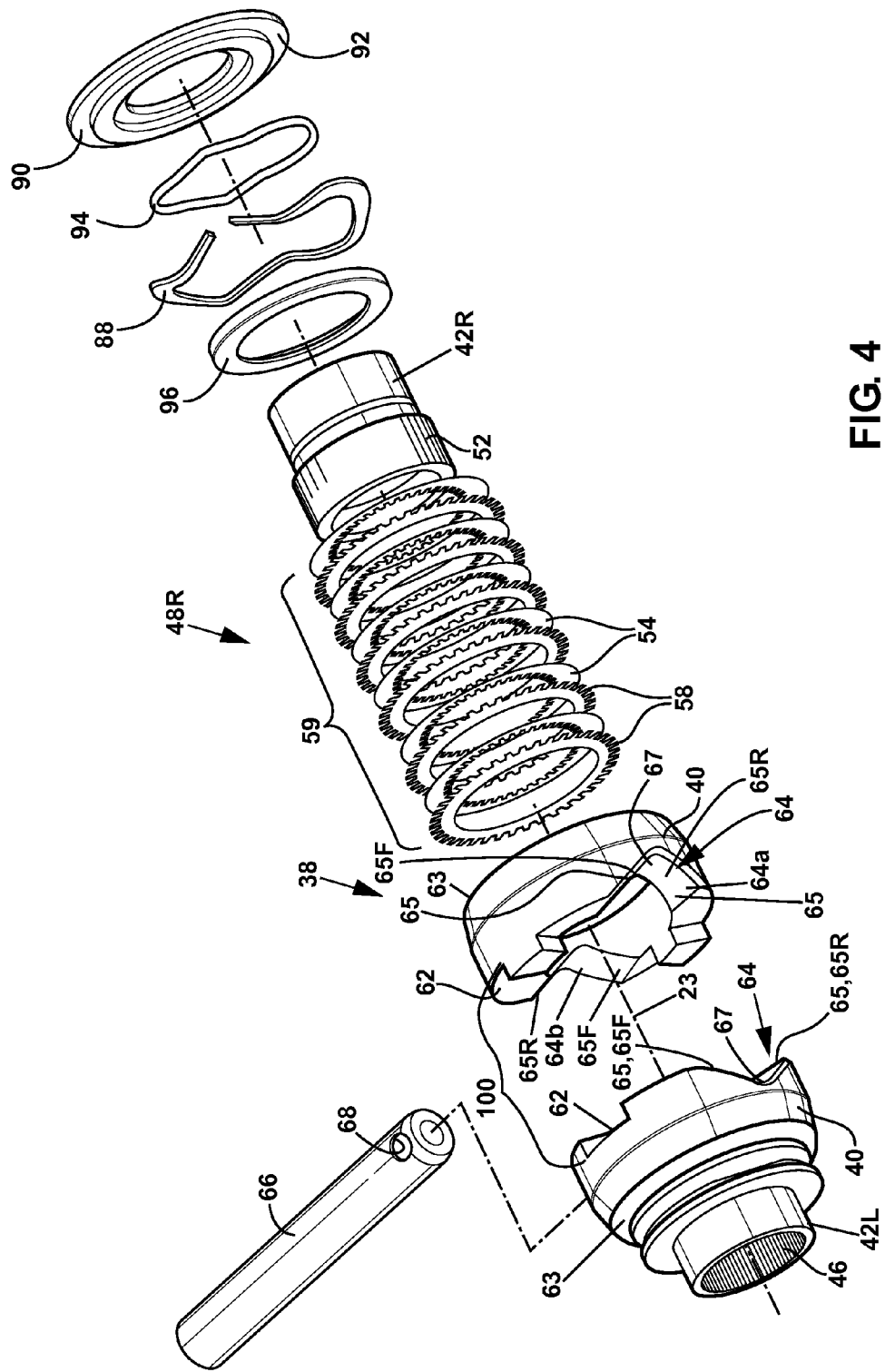
FIG. 4 is an exploded perspective view of one end of the differential mechanism of the present teachings.

The differential mechanism 38 is also illustrated in the exploded view of FIG. 4. The differential mechanism 38 includes left and right clutch members 40L, 40 R disposed in spaced axial relationship with respect to one another. The clutch members 40L, 40R are operatively supported for rotation with the housing 12. Left and right side gears 42L, 42R are each operatively adapted for rotation with a corresponding one of the left and right axle half shafts 30L, 30R. To this end, the side gears 42L, 42R each define a plurality of splines 46 on the inner circumference thereof that are matingly received in corresponding splines defined on their corresponding axle half shafts 30L, 30R. Left and right clutch mechanisms 48L, 48R are operatively disposed between the clutch members 40L, 40R and their corresponding side gears 42L, 42R. When actuated, the clutch mechanisms 48L, 48R are configured to transfer torque from the clutch members 40L, 40R to their respective side gears 42L, 42R so as to resist or prevent relative rotation about the axis of rotation 23 between the clutch members 40L, 40R and their respective side gears 40L, 40R. The side gears 42L, 42R include a plurality of splines 52 on the outer circumference thereof. The clutch mechanism 48L, 48R include a plurality of friction disks 54 that are cooperatively splined to the outer circumference of the side gears 42L, 42R and are rotatable therewith. Similarly, each of the clutch members 40L, 40R includes a plurality of splines 56 formed on the inner circumference thereof. A series of plates 58 have outer splines that engage the splined inner circumference 56 of the left and right clutch members 40L, 40R. The plates 58 are interleaved between the friction disks 54 supported on the side gears 42L, 42R. The plates 58 and the friction discs 54 form clutch packs 59. The clutch members 40L, 40R are axially moveable within the housing 12 to engage/actuate their respective clutch mechanism 48L, 48R by axially compressing together the plates 58 and friction discs 54 (i.e., the clutch packs 59). When the clutch mechanisms 48L, 48R are actuated, torque is transferred from the clutch members 40L, 40R, through the clutch packs 59 to the side gears 42L, 42R and their corresponding axle half shafts 30L, 30R. When both clutch mechanisms 48L, 48R are fully actuated, the housing 12, the clutch members 40L, 40R, the side gears 42L, 42R and the axle half shafts 30L, 30R all rotate in unison with each other about the axis of rotation 23. One representative example of the locking differential 10 of the type contemplated by the present teachings may also employ a plurality of biasing members (not shown) that are disposed between the clutch members 40L, 40R and received in pockets (not shown) formed in the opposed clutch members 40L, 40R to urge the clutch members 40L, 40R away from one another to pre-load the clutch packs 59.

Referring to FIG. 3, the clutch members 40L, 40R present inwardly directed faces 62 (i.e., inboard sides) that face toward a cross shaft or pin 66 mounted between the clutch members 40L, 40R. The clutch members 40L, 40R also include outwardly directed faces 63 (i.e., outbound sides) that face away from the pin 66. The inwardly directed faces 62 of the clutch members 40L, 40R oppose each other and are disposed in spaced axial relationship to one another. Each of the inwardly directed faces 62 of the clutch members 40 includes a groove 64 disposed in facing relationship with respect to the other. The cross pin 66 is received in the grooves 64 and is operatively connected for rotation with the housing 12 about the axis 23. The cross pin 66 is generally cylindrical in shape and has an aperture 68 extending radially therethrough at one end. Opposite ends of the cross pin 66 can fit within corresponding radial openings defined by the housing 12 and the aperture 68 allows the cross pin 66 to be pinned in place relative to the housing 12 to prevent the cross pin 66 from sliding along its axis relative to the housing 12. The grooves 64 are defined at the inwardly directed faces 62 of the clutch members 40L, 40R. Each groove 64 is defined by ramp surfaces 65 that converge toward a neutral position 67. The neutral positions 67 form the deepest portions of the grooves 64. The clutch members 40L, 40R can rotate a limited amount relative to the cross pin 66 about the axis 23 between actuated positions where the cross pin 66 engages (e.g., rides on) the ramp surfaces 65 and non-actuated positions where the cross pin 66 is offset from the ramp surfaces 65 and aligns with the neutral positions 67. Each groove 64 includes two groove portions 64a, 64b positioned on opposite sides of the axis 23. Each grove portion 64a, 64b includes a forward ramp 65F and a rearward ramp 65R separated from one another by the neutral position 67. During normal forward driving conditions, the cross pin 66 engages the forward ramp surfaces 65F to force the clutch members 40L, 40R axially outwardly thereby actuating the clutch mechanisms 48L, 48R. During normal rearward driving conditions, the cross pin 66 engages the rear ramp surfaces 65R to force the clutch members 40L, 40R axially outwardly thereby actuating the clutch mechanisms 48L, 48R.

Figure 5:
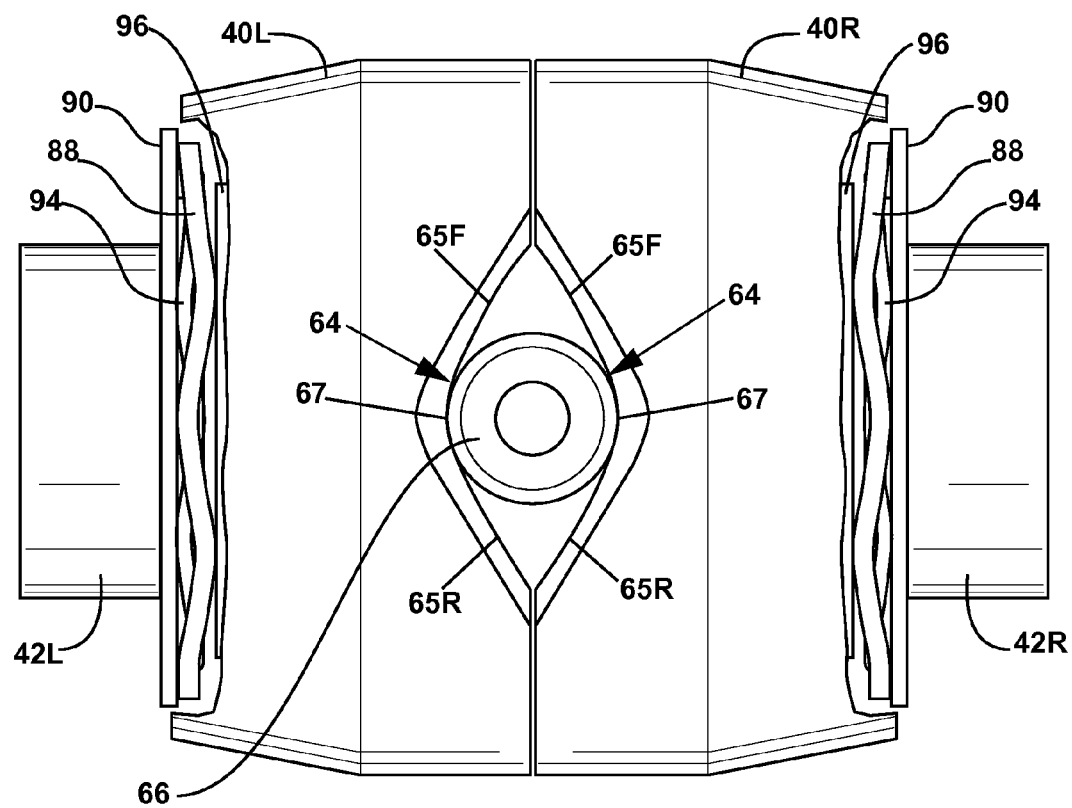
FIG. 5 is a side view of the differential mechanism of the present teachings.

Referring to FIGS. 4 and 5, the clutch mechanisms 48L, 48R include first springs 88 that are disposed on the outboard sides of the clutch members 40L, 40R to contact an outer surface of the clutch members 40L, 40R to pre-load the clutch members 40, 40R. The springs 88 bias the clutch members 40L, 40R in an inboard orientation against the cross pin 66. The first springs 88 can include wave springs each having a predetermined spring force. First washers 90 are disposed on the outboard sides of the first springs 88 for each of the clutch mechanisms 48, 50. Each first washer 90 has an annular recess 92. The clutch mechanisms 48L, 48R each include second springs 94 disposed in the annular recesses 92 of the first washers 90 to pre-load the clutch mechanisms 48L, 48R. The second springs 94 can include wave springs each having a predetermined spring force less than the predetermined spring force of each first spring 88. A second washer 96 may be disposed against the inboard side of each second spring 94. It should be appreciated that the springs 88, 94 are arranged in parallel for applying the pre-load to the clutch members 40 to maintain contact with the cross pin 66. In other examples, springs other than wave springs (e.g., coil springs, flat leaf springs, etc.) can be used as the first and/or second springs.

The clutch members 40L, 40R are axially moveable within the housing 12 to axially compress the clutch packs 59 of their respective clutch mechanisms 48L, 48R so as to actuate the clutch mechanisms 48L, 48R. Clutch actuation occurs when contact between the ramp surfaces 65 and the cross pin 66 forces the clutch members 40L, 40R axially outwardly to compress the clutch packs 59. The actuation forces are large enough allow a substantial amount of torque to be transferred through the clutch packs 59. In certain examples, the actuation forces are sufficiently large for the clutch packs 59 to essentially lock the clutch members 40L, 40R relative to their respective side gears 42L, 42R such that the side gears 42L, 42R and their respective clutch members 40L, 40R rotate in unison about the axis 23.

When the cross pin 66 is aligned with the neutral positions 67 of the grooves 64 of one of the clutch members 40L, 40R, the corresponding clutch pack 59 is not axially compressed by the corresponding clutch member 40L, 40R and is therefore not actuated. When the clutch pack is not actuated by its corresponding clutch member 40L, 40R, only pre-load is applied to the clutch pack. In this non-actuated state, the clutch plates and the friction discs can rotate relative to one another during a wheel overspeed condition. Thus, during a wheel overspeed condition, the non-actuated clutch pack corresponding to the overspeeding wheel permits the corresponding side gear 42L, 42R and its corresponding axle half shaft 30L, 30R to rotate relative to the corresponding clutch member 40L, 40R.

During normal straight driving conditions, the cross pin 66 engages the ramp surfaces 65 causing actuation of the clutch mechanisms 48L, 48R such that the clutch packs prevent relative rotation between the clutch members 40L, 40R and their corresponding side gears 42L, 42R. Thus, driving torque is transferred from the differential housing 12 and cross pin 66 through the clutch members 40L, 40R, the clutch packs and the side gears 42L, 42R to the axle half shafts 30L, 30R and the wheels 17L, 17R. Thus, with both clutch packs actuated, the differential housing 12, cross pin 66, the clutch members 40L, 40R, the side gears 42L, 42R, the axle half shafts 30L, 30R and the wheels 17L, 17R all rotate in unison about the axis 23. During an overspeed condition (e.g., during a turn), the clutch member 40L, 40R corresponding to the overspeeding wheel rotates relative to the cross pin 66 such that the cross-pin disengages from the ramp surfaces 65 and becomes aligned with the neutral positions 67 thereby causing the corresponding clutch pack to no longer be actuated. With the clutch pack no longer actuated, only pre-load pressure is applied to the corresponding clutch pack. The pre-load pressure is sufficiently low that the de-actuated clutch permits relative rotation between the clutch member 40L, 40R and its corresponding side gear 42L, 42R to accommodate the faster rotation of the overspeeding wheel relative to its corresponding clutch member 40L, 40R, the cross pin 66 and the differential housing 12. An intermating stop arrangement 100 defined between the inboard sides of the clutch members 40L, 40R allows for only a limited range of relative rotational movement between the clutch members 40L, 40R about the axis 23. The stop arrangement 100 ensures that the clutch members 40L, 40R don't over-rotate their corresponding neutral positions 67 past the cross pin 66 during an overspeed condition. If the clutch members 40L, 40R were to over-rotate during an overspeed condition, the cross pin 66 would inadvertently actuate a de-actuated clutch by engaging the ramp 65L, 65R on the opposite side of the neutral position 67. The stop arrangement 100 prevents this from happening thereby allowing the overspeeding wheel to maintain an overspeed condition during a turn without interference from the clutch mechanisms 42L, 42R.

As illustrated in FIG. 5, the differential mechanism 38 is shown assembled. In one embodiment, the first springs 88 pre-load the clutch members 40L, 40R only from the outside to maintain constant contact between the clutch members 40L, 40R and the cross pin 66. Thus, the first springs 88 do not direct pre-load through the clutch packs of their corresponding clutch mechanisms 48L, 48R. Instead, the clutch pack preload is determined only by the second springs 94. By offsetting a "spring contact" point of the springs 88 radially outward to the clutch members 40L, 40R, the pre-load exerted by the springs 88 can be applied only to the clutch members 40L, 40R, which maintains the contact between the clutch members 40L, 40R and the cross pin 66 and allows use of higher "spring" loads since the corresponding clutch mechanisms 48L, 48R receive no additional load. It should be appreciated that care must be taken not to increase this contact provided by springs 88 such that an excessive amount of resistance prevents a limited range of relative rotational movement about the axis 23 between the clutch members 40L, 40R and the cross pin 66 so as to prevent actuation of the clutch mechanisms 48L, 48R. For example, the pre-load provided by the first springs 88 should not prevent the cross pin 66 from riding up the ramps 65 to actuate the clutch mechanisms 42L, 42R during normal forward or reverse driving conditions.

The pre-load provided by the second springs 94 should be large enough such that the clutch packs provide sufficient resistance to rotational movement of the clutch members 40L, 40R about the axis 23 for the cross pin 66 to ride up on the ramps 65 and cause actuation of the clutch mechanisms 48L, 48R as differential housing 12 and the cross pin 66 carried therewith are rotated about the axis 23 during normal driving conditions. Also, the pre-load provided by the second springs 94 should not be so large so as to cause the wheels 17L, 17R to slip/skid relative to the ground/road surface when encountering an overspeed wheel condition. In one example, the clutch pre-load applied to each clutch pack allows the clutch packs to transfer a pre-load torque value that is less than a representative wheel slip torque value corresponding to the outside wheel during a turn. The representative wheel slip torque value (i.e., the torque required to have the wheel slip relative to the ground) is dependent upon the gross weight of the vehicle and a selected coefficient of friction between the ground and the wheel that corresponds to a low traction condition.

The present teachings have been described in great detail in the foregoing specification, and it is believed that various alterations and modifications of the many aspects of the present teachings will become apparent to those ordinary skilled in the art from a reading and understanding of the specification. It is intended that all such alterations and modifications are included in the present teachings, insofar as they come within the scope of the appended claims.

What is claimed is:

1. A differential for a vehicle comprising:
    a differential housing that is rotatable about an axis of rotation;
    clutch members positioned along the axis of rotation within the differential housing, wherein the clutch members comprise grooves defined by ramp surfaces that converge toward a neutral position;
    side gears adapted for rotation with corresponding axle half shafts relative to the differential housing about the axis of rotation;
    a cross pin carried with the differential housing as the differential housing rotates about the axis of rotation;
    clutch mechanisms each including clutch packs for transferring torque between the clutch members and the side gears when actuated, wherein the cross pin engages the ramp surfaces of the clutch members to actuate the clutch mechanisms to engage the side gears;
    the clutch members being axially moveable along the axis of rotation to actuate the clutch mechanisms, the clutch members presenting inwardly directed faces between which the cross pin is disposed, the inwardly directed faces defining opposing grooves in which the cross pin is received, the clutch members comprising a range of relative rotational movement with respect to each other about the axis of rotation; and
    a plurality of first pre-load springs applying first pre-loads only to the clutch members for biasing the clutch members toward the cross pin, the first pre-load springs not applying any first pre-loads not being applied through to the clutch packs.

2. A differential as set forth in claim 1, wherein the first pre-load springs comprise wave springs pre-loading the clutch members from outboard sides thereof.

3. A differential as set forth in claim 1, wherein the first pre-load springs and the second pre-load springs include wave springs.

4. A differential as set forth in claim 1, wherein the first pre-load springs have greater spring forces than the second pre-load springs.

5. A differential as set forth in claim 3, further including first washers disposed on outboard sides of the first pre-load springs.

6. A differential as set forth in claim 5, wherein the first washers have annular recesses.

7. A differential as set forth in claim 6, wherein the second pre-load springs are disposed in the annular recesses of the first washers.

8. A differential as set forth in claim 7, further including second washers disposed against inboard sides of the second pre-load springs.

9. A differential as set forth in claim 1, wherein the first and second pre-load springs are positioned in parallel to pre-load the clutch members.

10. A drive train including the differential of claim 1, the drive train including a drive shaft coupled to a drive gear that engages a ring gear carried by the differential housing, wherein the drive shaft and the drive gear provide torque for rotating the differential housing about the axis of rotation.

11. An axle assembly including the differential of claim 1, the axle assembly including the axle half shafts, and the axle half shafts being co-axially aligned along the axis of rotation.

12. A locking differential for a vehicle comprising:
    a housing and a differential mechanism supported in said housing, said differential mechanism including a pair of clutch members disposed in spaced axial relationship with respect to one another and operatively supported for rotation with said housing, the clutch members comprising a range of relative rotational movement with respect to each other about the axis of rotation;
    a pair of side gears operatively adapted for rotation with a corresponding pair of axle half shafts, and a pair of clutch packs operatively disposed between each corresponding pair of clutch members and said side gears;
    said clutch members being axially moveable within said housing to actuate the clutch packs;
    each of said clutch members presenting an inwardly directed face, each face including a groove disposed in facing relationship with respect to the other, the groove defined by ramp surfaces that converge toward a neutral position, and a cross pin received in said groove and operatively connected for rotation with said housing, wherein the cross pin engages the ramp surfaces of the clutch members to actuate the clutch mechanisms to engage the side gears; and
    first springs applying pre-load to only said clutch members and second springs applying pre-load to said clutch packs, said first springs not applying any pre-load to the clutch packs, said first springs each having a predetermined spring force and said second springs each having a predetermined spring force less than the predetermined spring force of said first springs.

13. A drive train including the differential of claim 12, the drive train including a drive shaft coupled to a drive gear that engages a ring gear carried by the housing, wherein the drive shaft and the drive gear provide torque for rotating the housing about the axis of rotation.

14. An axle assembly including the differential of claim 12, the axle assembly including the axle half shafts, and the axle half shafts being co-axially aligned along the axis of rotation.

15. A locking differential for a vehicle comprising:
a housing and a differential mechanism supported in said housing, said differential mechanism including a pair of clutch members disposed in spaced axial relationship with respect to one another and operatively supported for rotation with said housing;
a pair of side gears operatively adapted for rotation with a corresponding pair of axle half shafts, and a pair of clutch mechanisms operatively disposed between each corresponding pair of clutch members and said side gears;
said clutch members being axially moveable within said housing to actuate the clutch packs, the clutch members comprising a range of relative rotational movement with respect to each other;
each of said clutch members presenting an inwardly directed face, each face including a groove disposed in facing relationship with respect to the other, the groove defined by ramp surfaces that converge toward a neutral position, and a cross pin received in said groove and operatively connected for rotation with said housing, wherein the cross pin engages the ramp surfaces of the clutch members to actuate the clutch mechanisms to engage the side gears; and
first springs applying pre-load only to said clutch members and second springs applying pre-load to said clutch packs, said first springs not applying any pre-load to the clutch packs, said first springs comprising wave springs each having a predetermined spring force and said second springs comprising wave springs each having a predetermined spring force less than the predetermined spring force of said first springs.

16. A drive train including the differential of claim 15, the drive train including a drive shaft coupled to a drive gear that engages a ring gear carried by the housing, wherein the drive shaft and the drive gear provide torque for rotating the housing about the axis of rotation.

17. An axle assembly including the differential of claim 15, the axle assembly including the axle half shafts, and the axle half shafts being co-axially aligned along the axis of rotation.

18. The differential of claim 1, further comprising second pre-load springs for applying second pre-loads to the clutch packs, wherein the second pre-load springs pre-load the clutch packs from outboard sides thereof and wherein the first pre-load springs pre-load the clutch members from outboard side thereof, wherein the second pre-loads are applied through the clutch packs to the clutch members.

19. The differential of claim 1, further comprising second pre-load springs for applying second pre-loads to the clutch packs, wherein the second pre-load springs pre-load the clutch packs throughout the range of motion of the clutch members.

20. The differential of claim 1, wherein the first pre-load springs are positioned radially outward from the clutch packs.

21. The locking differential of claim 12, wherein the second springs pre-load the clutch packs from outboard sides thereof and wherein the first springs pre-load the clutch members from outboard side thereof, wherein the pre-load applied by the second springs is applied through the clutch packs to the clutch members.

22. The differential of claim 12, further comprising second pre-load springs for applying second pre-loads to the clutch packs, wherein the second pre-load springs pre-load the clutch packs throughout the range of motion of the clutch members.

23. The differential of claim 12, wherein the first pre-load springs are positioned radially outward from the clutch packs.

24. The locking differential of claim 15, wherein the second springs pre-load the clutch packs from outboard sides thereof, wherein the first springs pre-load the clutch members from outboard side thereof, and wherein the pre-load applied by the second springs is applied through the clutch packs to the clutch members.

25. The differential of claim 15, further comprising second pre-load springs for applying second pre-loads to the clutch packs, wherein the second pre-load springs pre-load the clutch packs throughout the range of motion of the clutch members.

26. The differential of claim 15, wherein the first pre-load springs are positioned radially outward from the clutch packs.

* * * * *